(12) United States Patent
Jeong et al.

(10) Patent No.: US 8,717,336 B2
(45) Date of Patent: *May 6, 2014

(54) LIGHT SENSING PANEL AND DISPLAY APPARATUS HAVING THE SAME

(75) Inventors: Ki-Hun Jeong, Cheonan-si (KR); Woongkwon Kim, Cheonan-si (KR); Kun-Wook Han, Seongnam-si (KR); Daecheol Kim, Hwaseong-si (KR); Sungryul Kim, Asan-si (KR); Sungjin Mun, Seoul (KR); Jung suk Bang, Guri-si (KR); Byeonghoon Cho, Seoul (KR)

(73) Assignee: Samsung Display Co., Ltd. (KR)

( * ) Notice: Subject to any disclaimer, the term of this patent is extended or adjusted under 35 U.S.C. 154(b) by 204 days.

This patent is subject to a terminal disclaimer.

(21) Appl. No.: 13/346,849

(22) Filed: Jan. 10, 2012

(65) Prior Publication Data
US 2013/0033455 A1    Feb. 7, 2013

(30) Foreign Application Priority Data
Aug. 3, 2011    (KR) .................. 10-2011-0077493

(51) Int. Cl.
*G09G 5/00*    (2006.01)

(52) U.S. Cl.
USPC ........ 345/175; 345/176; 345/207; 178/18.01; 178/18.09

(58) Field of Classification Search
USPC ..................... 345/87–89, 173–178, 204, 207; 178/18.01–19.06
See application file for complete search history.

(56) References Cited

U.S. PATENT DOCUMENTS

| | | | |
|---|---|---|---|
| 6,636,064 B1 * | 10/2003 | Satya et al. | 324/750.3 |
| 7,741,646 B2 | 6/2010 | Kang et al. | |
| 7,800,602 B2 | 9/2010 | Choi et al. | |
| 8,289,285 B2 * | 10/2012 | Jang et al. | 345/173 |
| 2011/0261040 A1 * | 10/2011 | Han et al. | 345/207 |

FOREIGN PATENT DOCUMENTS

| | | |
|---|---|---|
| JP | 2005-196737 A | 7/2005 |
| JP | 2007-065239 A | 3/2007 |
| JP | 2007-164127 A | 6/2007 |
| KR | 1020070063263 A | 6/2007 |
| KR | 10-0983524 B1 | 9/2010 |

* cited by examiner

*Primary Examiner* — Jennifer Nguyen
(74) *Attorney, Agent, or Firm* — Cantor Colburn LLP

(57) ABSTRACT

A light sensing panel includes sensors arranged in rows and columns, where the sensors receive a first bias voltage and a second bias voltage and output light sensing signals based on light incident thereto; first and second bias lines which transfers the first and second bias voltages, respectively, to the sensors, where each of the first and second bias lines includes a main line and sub lines diverged from the main line and arranged in a second direction corresponding to the columns;, where the sub lines of the first and second bias lines are alternately arranged, and where when two adjacent sub lines are shorted, the shorted sub line of the first bias line is separated from the main line of the first bias line.

15 Claims, 12 Drawing Sheets

LIGHT SENSING PANEL AND DISPLAY APPARATUS HAVING THE SAME

This application claims priority to Korean Patent Application No. 10-2011-0077493, filed on Aug. 3, 2011, and all the benefits accruing therefrom under U.S.C. §119, the content of which in its entirety is herein incorporated by reference.

BACKGROUND OF THE INVENTION (1) Field of the Invention

Exemplary embodiments of the invention relate to a light sensing panel and a display device including the light sensing panel.

(2) Description of the Related Art

A demand of an image display device with a light sensing panel has been increased because the image display device does not necessitate separate input devices such as a keyboard and a mouse, for example.

The light sensing panel has been applied to a liquid crystal display device. In a conventional liquid crystal display including the light sensing panel, the light sensing panel is typically provided at an upper side of the liquid crystal display device to detect location information in response to an input from a user. When a touch panel is separately provided on the liquid crystal display device, optical characteristics of the liquid crystal display device, such as brightness and viewing angle, are deteriorated, and a total thickness of the liquid crystal display device substantially increases by a thickness of the touch panel.

BRIEF SUMMARY OF THE INVENTION

An exemplary embodiments of the invention provides a light sensing panel including a plurality of sensors arranged in a plurality of rows and a plurality of columns, where the plurality of sensors receives a first bias voltage and a second bias voltage and outputs light sensing signals based on light incident thereto; a first bias line which transfers the first bias voltage to the plurality of sensors; and a second bias line which transfers the second bias voltage to the plurality of sensors, where the first bias line includes a first main line and a plurality of first sub lines diverged from the first main line and arranged in a second direction corresponding to the plurality of columns of the plurality of sensors, where the second bias line includes a second main line, and a plurality of second sub lines diverged from the second main line and arranged in the second direction corresponding to the plurality of columns of the plurality of sensors, where the plurality of first sub lines and the plurality of second sub lines are alternately arranged, and where when a first sub line of the plurality of first sub lines is shorted with a second sub line of the plurality of second sub lines adjacent to the first sub line, the shorted first sub line is separated from the first main line.

In an exemplary embodiment, the light sensing panel may further include a plurality of scan lines corresponding to the plurality of rows, where each of the plurality of scan lines transfers a scan signal to corresponding sensors of the plurality of sensors, and a plurality of read-out lines which transfers the light sensing signals output from the plurality of sensors.

In an exemplary embodiment, each of the plurality of sensors may include a capacitor having a first electrode and a second electrode; a switching element which outputs a voltage of the first electrode of the capacitor to a corresponding read-out line of the plurality of read-out lines in response to a scan signal transferred via a corresponding scan line of the plurality of scan lines, and a light sensing transistor having a first end connected to the first electrode of the capacitor, a second end connected to the second electrode of the capacitor, and a gate connected to a corresponding second sub line of the plurality of second sub lines, where the second electrode of the capacitor is connected to a corresponding first sub line of the plurality of first sub lines.

In an exemplary embodiment, when a second sub line of the plurality of second sub lines is shorted with a first sub line adjacent to the second sub line, the shorted second sub line may be separated from the second main line.

In an exemplary embodiment, the light sensing panel may further includes a third bias line which transfers a third bias voltage, where the shorted first sub line separated from the first main line and the shorted second sub line separated from the second main line are connected to the third bias line.

In an exemplary embodiment, the third bias voltage may have a voltage in a range between the first bias voltage and the second bias voltage.

In an exemplary embodiment, the plurality of sensors may include a plurality of first sensors which senses light in an infrared wavelength range, and a plurality of second sensors which senses light in a visible wavelength range.

In an exemplary embodiment of the invention, a display device includes a display panel which display an image, where the display panel includes a first substrate, and a second substrate opposite to the first substrate, where one of the first substrate and the second substrate of the display panel includes a plurality of sensors arranged in a plurality of rows and a plurality of columns, where the plurality of sensors receives a first bias voltage and a second bias voltage and outputs light sensing signals based on light incident thereto, a first bias line which transfers the first bias voltage to the plurality of sensors, and a second bias line which transfers the second bias voltage to the plurality of sensors, where the first bias line includes a first main line and a plurality of first sub lines diverged from the first main line and arranged in a second direction corresponding to the plurality of columns of the plurality of sensors, where the second bias line includes a second main line and a plurality of second sub lines diverged from the second main line and arranged in the second direction corresponding to the plurality of columns of the plurality of sensors, where the plurality of first sub lines and the plurality of second sub lines are alternately arranged, and where when a first sub line of the plurality of first sub lines is shorted with a second sub line of the plurality of second sub lines adjacent to the first sub line, the shorted first sub line is separated from the first main line.

In an exemplary embodiment, the first substrate may include a plurality of pixels, and the second substrate may include the plurality of sensors, the first bias line and the second bias line.

In an exemplary embodiment, the second substrate may include a plurality of scan lines corresponding to the plurality of rows, where each of the plurality of scan lines transfers a scan signal to corresponding sensors of the plurality of sensors, and a plurality of read-out lines which transfers the light sensing signals output from the plurality of sensors.

In an exemplary embodiment, each of the plurality of sensors may include a capacitor having a first electrode and a second electrode, a switching element which outputs a voltage of the first electrode of the capacitor to a corresponding read-out line of the plurality of read-out lines in response to a scan signal transferred via a corresponding scan line of the plurality of scan lines, and a light sensing transistor having a first end connected to the first electrode of the capacitor, second end connected to the second electrode of the capacitor, and a gate connected to a corresponding second sub line of the plurality of second sub lines, where the second electrode of the capacitor may be connected to a corresponding first sub line of the first sub lines.

In an exemplary embodiment, when a second sub line of the second sub lines is shorted with a first sub line adjacent to the second sub line, the shorted second sub line may be separated from the second main line.

In an exemplary embodiment, the second substrate may further include a third bias line which transfers a third bias voltage, where the shorted first sub line separated from the first main line and the shorted second sub line separated from the second main line are connected to the third bias line.

In an exemplary embodiment, the third bias voltage may have a voltage in a range between the first bias voltage and the second bias voltage.

In an exemplary embodiment, the plurality of sensors may include a plurality of first sensors which senses light in an infrared wavelength range, and a plurality of second sensors which senses light in a visible wavelength range.

BRIEF DESCRIPTION OF THE DRAWINGS

The above and other aspects and features will become more apparent by describing in further detail exemplary embodiments thereof with reference to the accompanying drawings, in which.

DETAILED DESCRIPTION OF THE INVENTION

Figure 1:
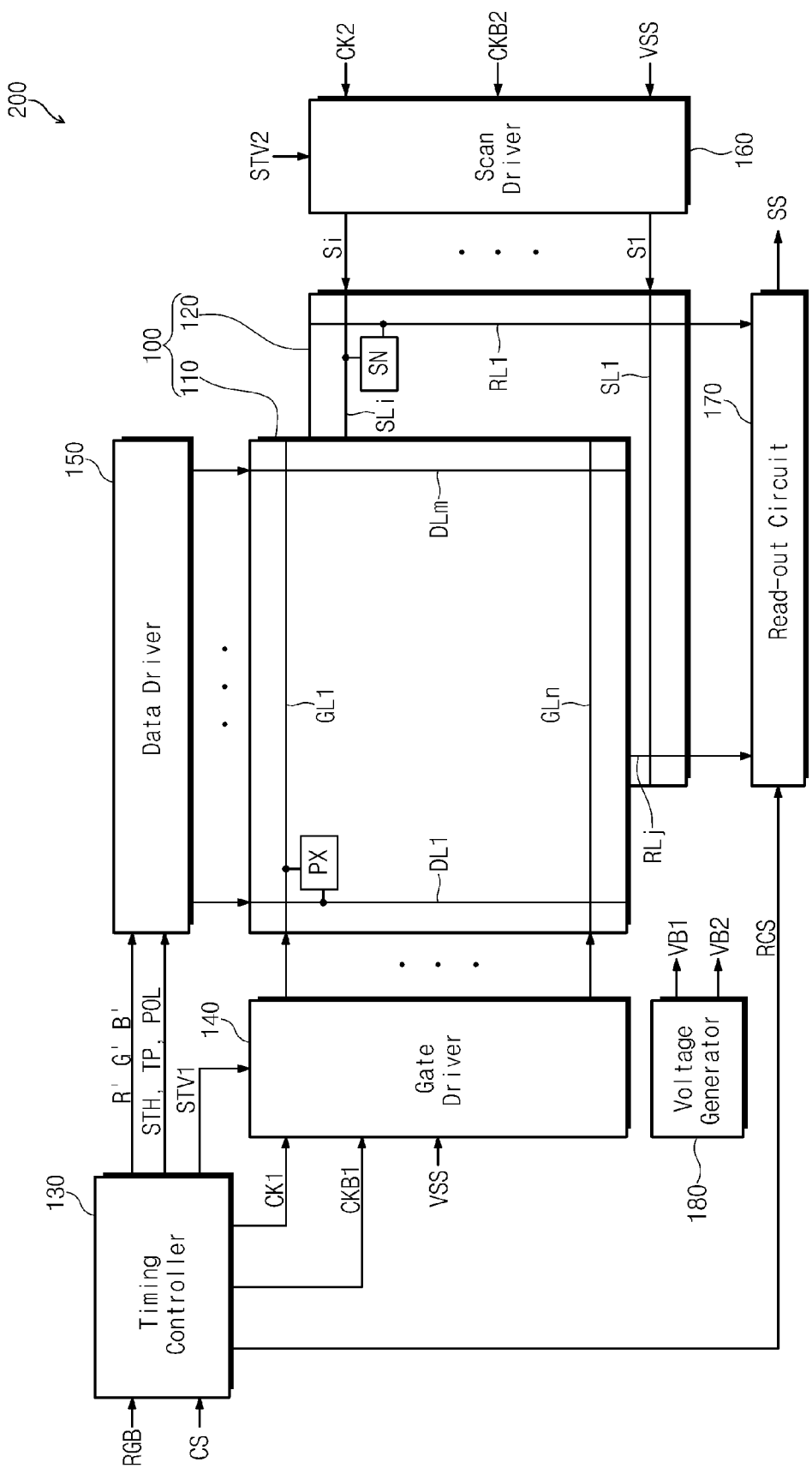
FIG. 1 is a block diagram illustrating an exemplary embodiment of a display device according to the invention.

The invention is described more fully hereinafter with reference to the accompanying drawings, in which various embodiments are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms.

These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in further detail with reference to the accompanying drawings.

Figure 2:
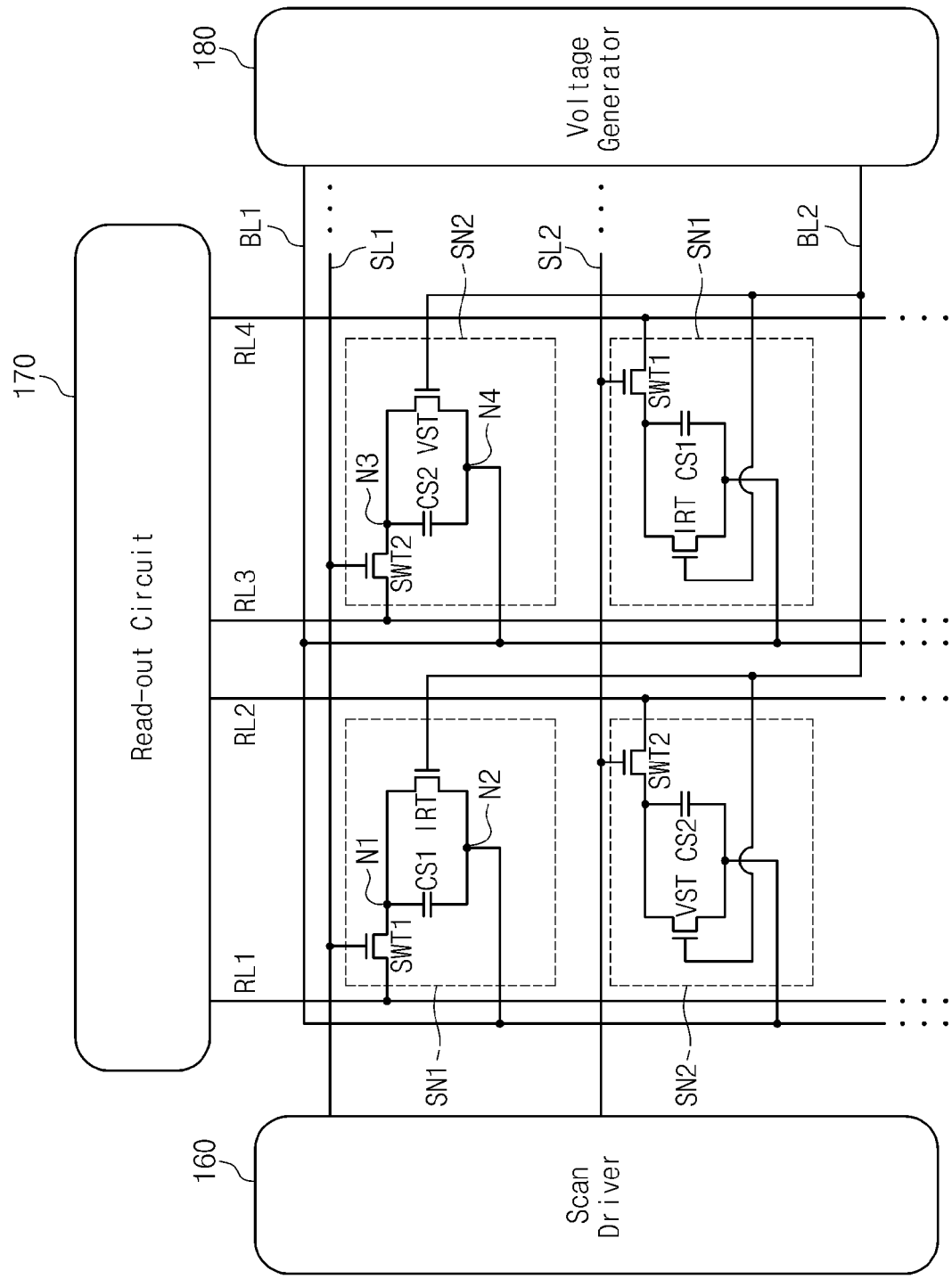
FIG. 2 is a circuit diagram illustrating a plurality of sensors illustrated in FIG. 1.

FIG. 1 is a block diagram illustrating an exemplary embodiment of a display device according to the invention, and FIG. 2 is a circuit diagram illustrating an exemplary embodiment of a plurality of sensors illustrated in FIG. 1.

Referring to FIG. 1, a display device 200 may include a display panel 100, a timing controller 130, a gate driver 140, a data driver 150, a scan driver 160, a read-out circuit 170 and a voltage generator 180.

The timing controller 130 may receive image signals RGB and control signals CS from an external device disposed outside the display device 200. The timing controller 130 may convert a data format of the image signals RGB based on an interface specification with the data driver 150, and may provide the converted image signals R'G'B' to the data driver 150. The timing controller 130 may provide the data driver 150 with data control signals (e.g., an output start signal TP, a horizontal start signal STH and a polarity reverse signal POL) and the gate driver 140 with gate control signals (e.g., a first start signal STV1, a first clock signal CK1 and a second clock signal CKB1).

The gate driver 140 may sequentially output gate signals G1 through Gn in response to the gate control signals STV1, CK1 and CKB1 provided from the timing controller 130.

The data driver 150 may convert the converted image signals R'G'B' into data voltages D1 through Dm in response to the data control signals TP, STH and POL provided from the timing controller 130. The data voltages D1 through Dm may be output to the display panel 100.

The display panel 100 may include a first substrate 110, a second substrate 120 disposed to be opposite to the first substrate 110, and a liquid crystal layer (not shown) interposed between the first substrate 110 and the second substrate 120. The first substrate 110 may include a plurality of pixels PX and the second substrate 120 may include a plurality of sensors SN.

Each of the pixels PX may have a same structure, and one pixel will hereinafter be described for convenience of description.

The first substrate 110 may include a plurality of gate lines GL1 through GLn, a plurality of data lines DL1 through DLm crossing the plurality of gate lines GL1 through GLn, and a plurality of pixels PX. Although not shown, each of the pixels PX may include a thin film transistor and a pixel electrode. A gate electrode of the thin film transistor may be connected to a corresponding gate line of the gate lines GL1 through GLn, a source electrode of the thin film transistor may be connected to a corresponding data line of the data lines DL1 through DLm, and a drain electrode of the thin film transistor may be connected to the pixel electrode.

The gate lines GL1 through GLn may be connected to the gate driver 140, and the data lines DL1 through DLm may be connected to the data driver 150. The gate lines GL1 through GLn may receive the gate lines G1 through Gm provided from the gate line 140, and the data lines DL1 through DLm may receive the data voltages D1 through Dm provided from the data driver 150.

In such an embodiment, the thin film transistor of each of the pixels PX may be turned on in response to a gate signal supplied to the corresponding gate line, and a data voltage supplied to the corresponding data line may be transferred to the pixel electrode via the turned-on thin film transistor.

The second substrate 120 may include a reference electrode opposite to the pixel electrode, and a liquid crystal layer interposed between the reference electrode and the pixel electrode.

The second substrate 120 may include a plurality of scan lines SL1 through
SLi, a plurality of read-out lines RL1 through RLj crossing the plurality of scan lines SL1 through SLi, and a plurality of sensors SN.

For convenience of description, first and second scan lines SL1 and SL2 of the plurality of scan lines SL1 through SLi and first through fourth read-out lines RL1 through RL4 of the plurality of read-out lines RL1 through RLj are illustrated in FIG. 2.

Referring to FIG. 2, a plurality of sensors SN may include at least two types of sensors. In one exemplary embodiment, for example, the plurality of sensors SN may include a plurality of first sensors SN1 that senses first light in an infrared wavelength range and a plurality of second sensors SN2 that senses second light in a visible-ray wavelength range.

Each of the first sensors SN1 may include a first switching transistor SWT1, a first sensor transistor IRT and a first capacitor CS1. A gate electrode of the first switching transistor SWT1 may be connected to a corresponding scan line of the plurality of scan lines SL1 through SLi, a source electrode of the first switching transistor SWT1 may be connected to a corresponding read-out line of the plurality of read-out lines RL1 through RLj, and a drain electrode of the first switching transistor SWT1 may be connected to the first capacitor CS1 and the first sensor transistor IRT.

A first electrode N1 of the first capacitor CS1 may be connected to the drain electrode of the first switching transistor SWT1, and a second electrode N2 of the first capacitor CS1 may be supplied with a first bias voltage VB1 via a first bias line BL1. In one exemplary embodiment, for example, the first bias voltage VB1 may be −4 volts (V).

A second bias voltage VB2 may be applied to a gate electrode of the first sensor transistor IRT via a second bias line BL2, and the first bias voltage VB1 may be applied to its drain electrode. A source electrode of the first sensor transistor IRT may be connected to the drain electrode of the first switching transistor SWT1. A level of the second bias voltage VB2 may be lower than a level of the first bias voltage VB1. In one exemplary embodiment, for example, the second bias voltage VB2 may be −9 V.

The first sensor transistor IRT may generate a photo current corresponding to an amount of the first light incident from an external device. The first light may be light in the infrared wavelength range. A voltage charged in the first capacitor CS1 may increase based on the photo current generated from the first sensor transistor IRT. In such an embodiment, as the amount of the first light incident onto the first sensor transistor IRT increases, a charged voltage of the first capacitor CS1 may increases, such that the first sensor transistor IRT senses the first light.

Each of the second sensors SN2 may include a second switching transistor SWT2, a second sensor transistor VST and a second capacitor CS2. A gate electrode of the second switching transistor SWT2 may be connected to a corresponding scan line of the plurality of scan lines SL1 through SLi, a source electrode of the second switching transistor SWT2 may be connected to a corresponding read-out line of the plurality of read-out lines
RL1 through RLj, and a drain electrode of the second switching transistor SWT2 may be connected to the second capacitor CS2 and the second sensor transistor VST.

A first electrode N3 of the second capacitor CS2 may be connected to the drain electrode of the second switching transistor SWT2, and the first bias voltage VB1 may be applied to a second electrode N4 of the second capacitor CS2 via the first bias line BL1.

The second bias voltage VB2 may be supplied to a gate electrode of the second sensor transistor VST via the second bias line BL2, and the first bias voltage VB1 may be applied to a drain electrode of the second sensor transistor VST. A source electrode of the second sensor transistor VST may be connected to the drain electrode of the second switching transistor SWT2.

The second sensor transistor VST may generate a photo current corresponding to an amount of the second light incident from an external device. The second light may be light in a visible-ray wavelength range. A voltage charged in the second capacitor CS2 may increase based on the photo current generated from the second sensor transistor VST such that the second sensor transistor SN2 senses the second light.

The plurality of scan lines SL1 through SLi may be connected with the scan driver 160 to sequentially receive the plurality of scan signals S1 through Si. The scan driver 160 may receive scan control signals (e.g., a second start signal STV2, and third and fourth clock signals CK2 and CKB2) from the timing controller 130 to sequentially output the scan signals S1 through Si. The scan control signals STV2, CK2 and CKB2 may be signals synchronized with the gate control signals STV1, CK1 and CKB1.

The read-out lines RL1 through RLj may be connected to the read-out circuit 170 to provide the read-out circuit 170 with voltages charged by corresponding sensors SN1 and SN2.

The voltage generator 180 may generate voltages used for an operation of the display device 200. In one exemplary embodiment, for example, the voltage generator 180 may generate the first and second bias voltages VB1 and VB2 supplied to gates of the sensors SN1 and SN2 via the first and second bias lines BL1 and BL2. The first bias lines BL1 and BL2 will be described later in greater detail.

As illustrated in FIG. 2, the first and second sensors SN1 and SN2 may be alternately arranged in a first direction along which the scan lines SL1 through SLi are extending and in a second direction along which the read-out lines RL1 through RLj are extending.

In an exemplary embodiment, the first sensors SN1 may be connected to a (4k-3)-th read-out line (e.g., a first read-out line RL1 in FIG. 2) and a 4k-th read-out line (e.g., a fourth read-out line RL4) of the read-out lines RL1 through RLj. The second sensors SN2 may be connected to a (4k-2)-th read-out line (e.g., a second read-out line RL2 in FIG. 2) and a (4k-1)-th read-out line (e.g., a third read-out line RL3) of the read-out lines RL1 through RLj.

When the first and second switching transistors SWT1 and SWT2 are turned on in response to a scan line supplied via a corresponding scan line, the first and second sensors SN1 and SN2 may provide voltages charged by the first and second capacitors CS1 and CS2 as light sensing signals to corresponding read-out lines via the turned-on switching transistors SWT1 and SWT2.

The read-out circuit 170 may sequentially provide the timing controller 130 with voltages SS input from the read-out lines RL1 through RLj in response to control signals RCS supplied from the timing controller 130. The timing controller 130 may generate a two-dimensional coordinate value of information associated with a touched on a screen or an object to be scanned, based on a time when a scan signal is generated and a voltage SS input from the read-out circuit 170.

Figure 3:
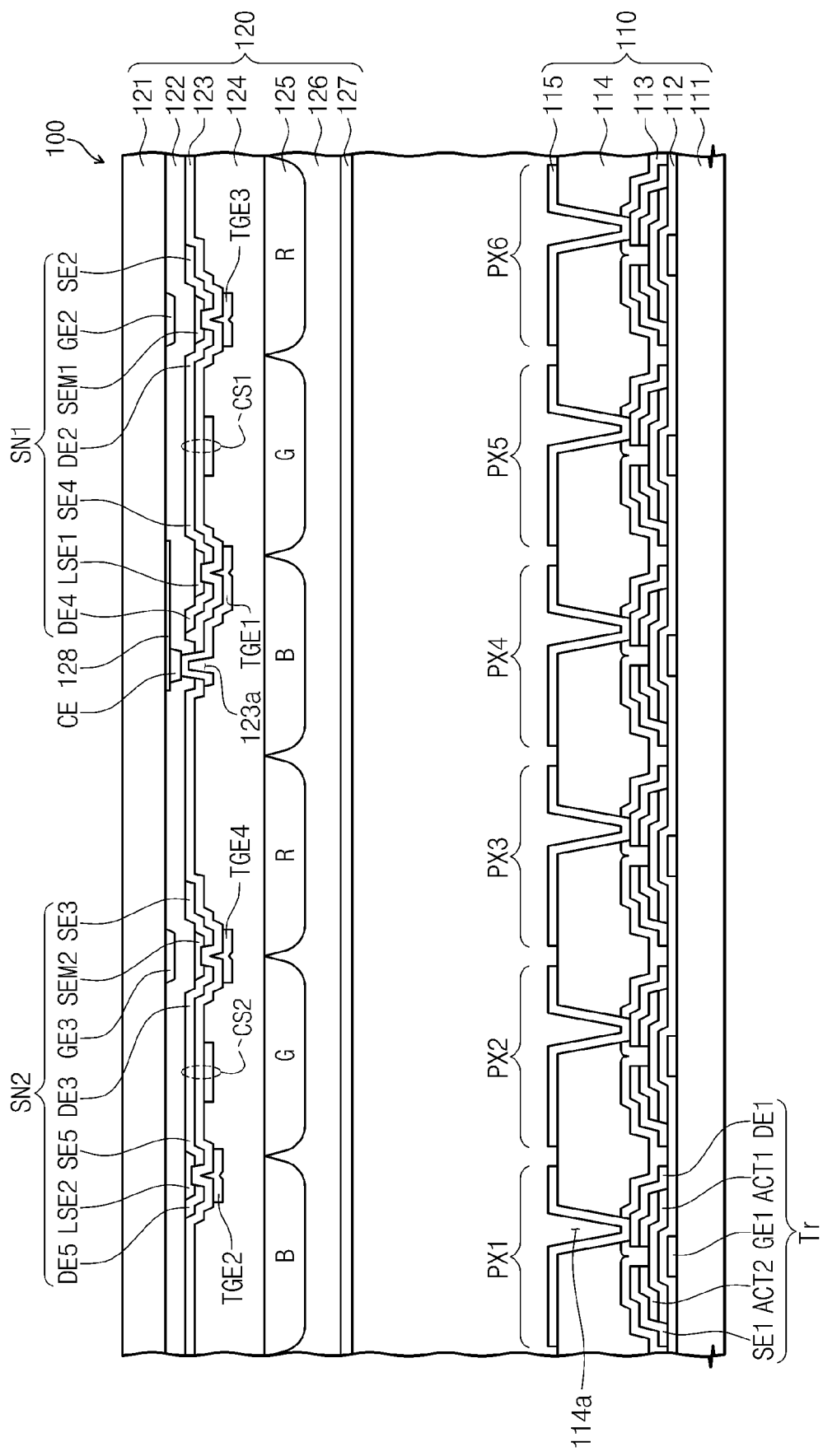
FIG. 3 is a cross sectional view of an exemplary embodiment of a display panel according to the invention.

FIG. 3 is a cross sectional view of an exemplary embodiment of a display panel according to an embodiment of the invention.

Referring to FIG. 3, a display panel 100 may include a first substrate 110, a second substrate 120 disposed opposite to the first substrate 110, and a liquid crystal layer interposed between the first substrate 110 and the second substrate 120.

The first substrate 110 may include a first base substrate 111 and a plurality of pixels PX provided on the first base substrate 111. Each of the plurality of pixels PX may include a thin film transistor Tr and a pixel electrode 115.

Figure 6:
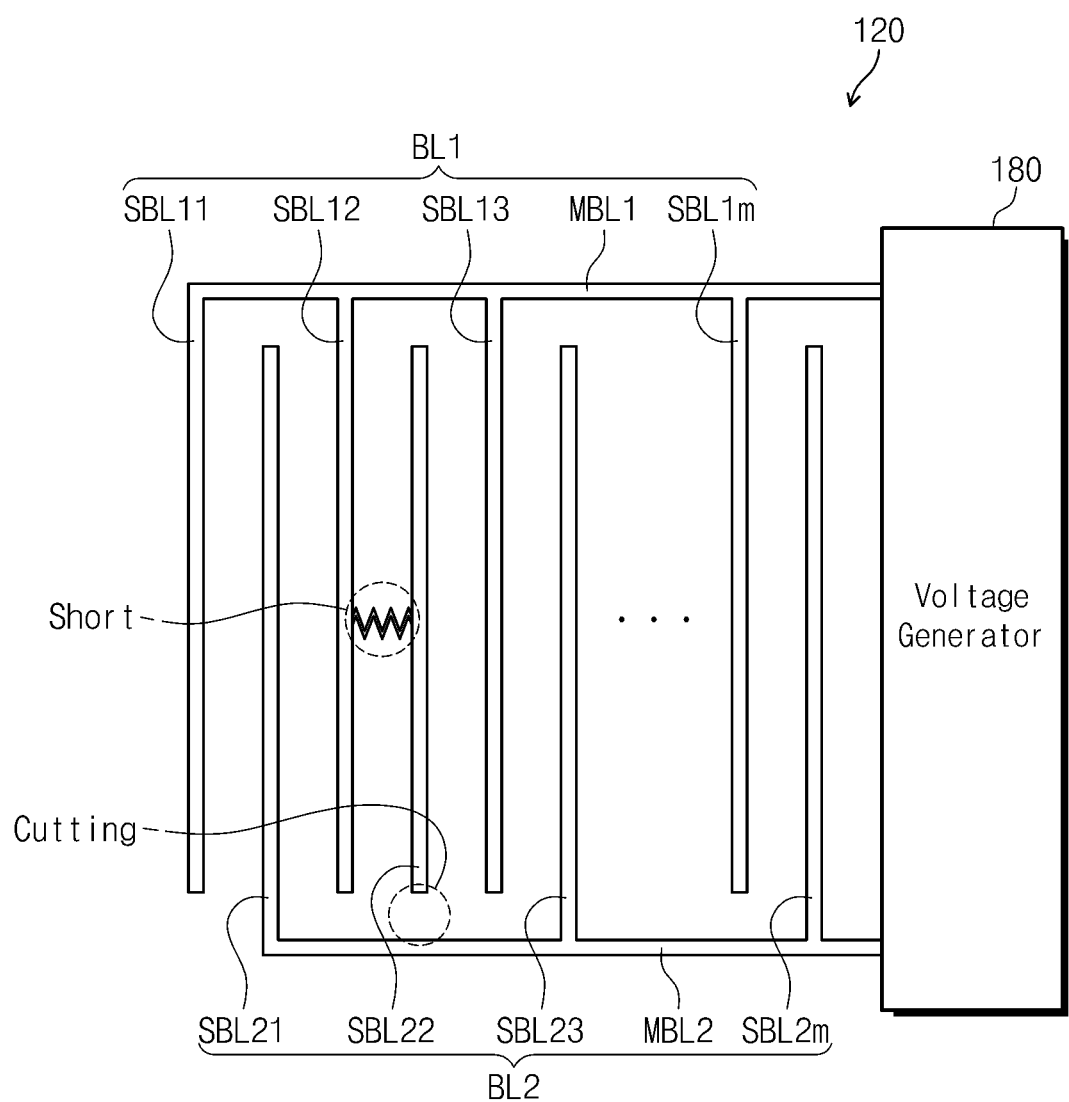
FIG. 6 is a diagram illustrating an exemplary embodiment of a second sub line which is separated from a second main line when first and second sub lines are shorted.

Six pixels PX1 through PX6 arranged in a first direction are illustrated in FIG. 6. The six pixels PX1 through PX6 may be provided to have the same structure. The invention will be described on the basis of one pixel.

A gate electrode GE1 of the thin film transistor Tr may be provided on the first base substrate 111. The gate electrode GE1 may be covered by a first gate insulation film 112.

An active layer ACT1 and an ohmic contact layer ACT2 may be provided on the first gate insulation film 112 and opposite to the gate electrode GE1. Source and drain electrodes SE1 and DE1 may be provided on the active layer ACT1 and spaced apart from each other. The source and drain electrodes SE1 and DE1 may be covered by a first protection film 113, and an organic insulation film 114 may cover the first protection film 113.

A contact hole 114a may be formed through the first protection film 113 and the organic insulation film 114 to expose the drain electrode DE1. A pixel electrode 115 may be provided on the organic insulation film 114, and may be electrically connected with the drain electrode DE1 via the contact hole 114a.

The second substrate 120 may include a second base substrate 121, a color filter layer 125 and a reference electrode 127. The color filter layer 125 may include a plurality of sensors SN formed on the second base substrate 121 and a plurality of color pixels R, G and B corresponding to the plurality of pixels PX, respectively.

A plurality of sensors SN may be provided on the second base substrate 121. The plurality of sensors SN may include a first sensor SN1 and a second sensor SN2. The first sensor SN1 may include a first switching transistor SWT1, a first capacitor CS1, and a first sensor transistor IRT. The second sensor SN2 may include a second switching transistor SWT2, a second capacitor CS2 and a second sensor transistor VST.

The first and second sensors SN1 and SN2 may be provided during a same process to have a similar structure.

Gate electrodes GE2 and GE3 of the first and second switching transistors SWT1 and SWT2 may be provided on the second base substrate 121.

The gate electrodes GE2 and GE3 of the first and second switching transistors SWT1 and SWT2 may be provided on a second gate insulation film 122. A semiconductor layer SEMI of the first switching transistor SWT1 may be provided on the second gate insulation film 122, and a semiconductor layer SEM2 of the second switching transistor SWT2 may be provided thereon. The semiconductor layers SEMI and SEM2 may include an amorphous silicon layer.

A first light sensing layer LSE1 of the first sensor transistor IRT and a second light sensing layer LSE2 of the second sensor transistor VST may be provided on the second gate insulation film 122. The first light sensing layer LSE1 may include silicon germanium (SiGe) which reacts on the first light in an infrared wavelength range, and the second light sensing layer LSE2 may include amorphous silicon ("a-Si") which reacts on the second light in a visible-ray wavelength range.

The second substrate 120 may further include an infrared filter 128 which blocks the second light and penetrates the first light. The infrared filter 128 may be provided between the second base substrate 121 and the second gate insulation film 122 in a portion corresponding to the first light sensing layer LSE1. In one exemplary embodiment, for example, the infrared filter 128 may include silicon germanium (SiGe).

Source and drain electrodes SE2 and DE2 of the first switching transistor SWT1 may be provided on the semiconductor layer SEMI and spaced apart from each other. Source and drain electrodes SE3 and DE3 may be provided on the semiconductor layer SEM2 of the second switching transistor SWT2 to be spaced apart from each other such that the first and second switching transistors SWT1 and SWT2 are provided in the second substrate 120.

Source and drain electrodes SE4 and DE4 of the first sensor transistor IRT may be provided on the first light sensing layer LSE1 to be spaced apart from each other. Source and drain electrodes SE5 and DE5 of the second sensor transistor VST may be provided on the second light sensing layer LSE2 and spaced apart from each other.

In an exemplary embodiment, the source electrode SE4 of the first sensor transistor IRT may be electrically connected with the drain electrode DE2 of the first switching transistor SWT1 and provided as a first electrode N1 of the first capacitor CS1.

The source electrode SE5 of the second sensor transistor VST may be electrically connected with the drain electrode DE3 of the second switching transistor SWT2 and provided as a first electrode N3 of the second capacitor CS2.

The source and drain electrodes SE2 and DE2 of the first switching transistor SWT1, the source and drain electrodes SE3 and DE3 of the second switching transistor SWT2, the source and drain electrodes SE4 and DE4 of the first sensor transistor IRT, and the source and drain electrodes SE5 and DE5 of the second sensor transistor VST may be covered by a second protection film 123.

A gate electrode (hereinafter, referred to as a first top gate) TGE1 of the first sensor transistor IRT and a gate electrode (hereinafter, referred to as a second top gate) TGE2 of the second sensor transistor VST may be provided on the second protection film 123 may be provided on the second protection film 123.

A second electrode of the first capacitor CS1 and a second electrode of the second capacitor CS2 may be provided on the second protection film 123.

In an exemplary embodiment, the first switchingtransistor SWT1 may further include a dummy gate electrode TGE3 provided on the second protection film 123 and electrically connected with the gate electrode GE2. The second switching transistor SWT2 may further include a dummy gate electrode TGE4 provided on the second protection film 123 and electrically connected with the gate electrode GE3.

As illustrated in FIG. 3, the first top gate TGE1 of the first sensor transistor IRT may be electrically connected with the infrared filter 128. In an exemplary embodiment, a connection electrode CE may be provided on the infrared filter 128 during a same process in which the gate electrode GE2 of the first switching transistor SWT1 is provided. A second contact hole 123a may be formed through the second gate insulation film 122 and the second protection film 123 to expose the connection electrode TGE1, and the first top electrode TGE1 may be electrically connected with the connection electrode CE via the second contact hole 123a.

The first and second top gates TGE1 and TGE2 of the first and second sensor transistors IRT and VST and the dummy gate electrodes TGE3 and TGE4 of the first and second switching transistors SWT1 and SWT2 may be covered by a second organic insulation film 124. The color filter layer 125 may be provided on the second organic insulation film 124. The color filter layer 125 may correspond to one of red, green and blue color pixels R, G and B.

An over coating layer 126 may be provided on the color filter layer 125, and the reference electrode 127 may be provided on the over coating layer 126.

Figure 4:
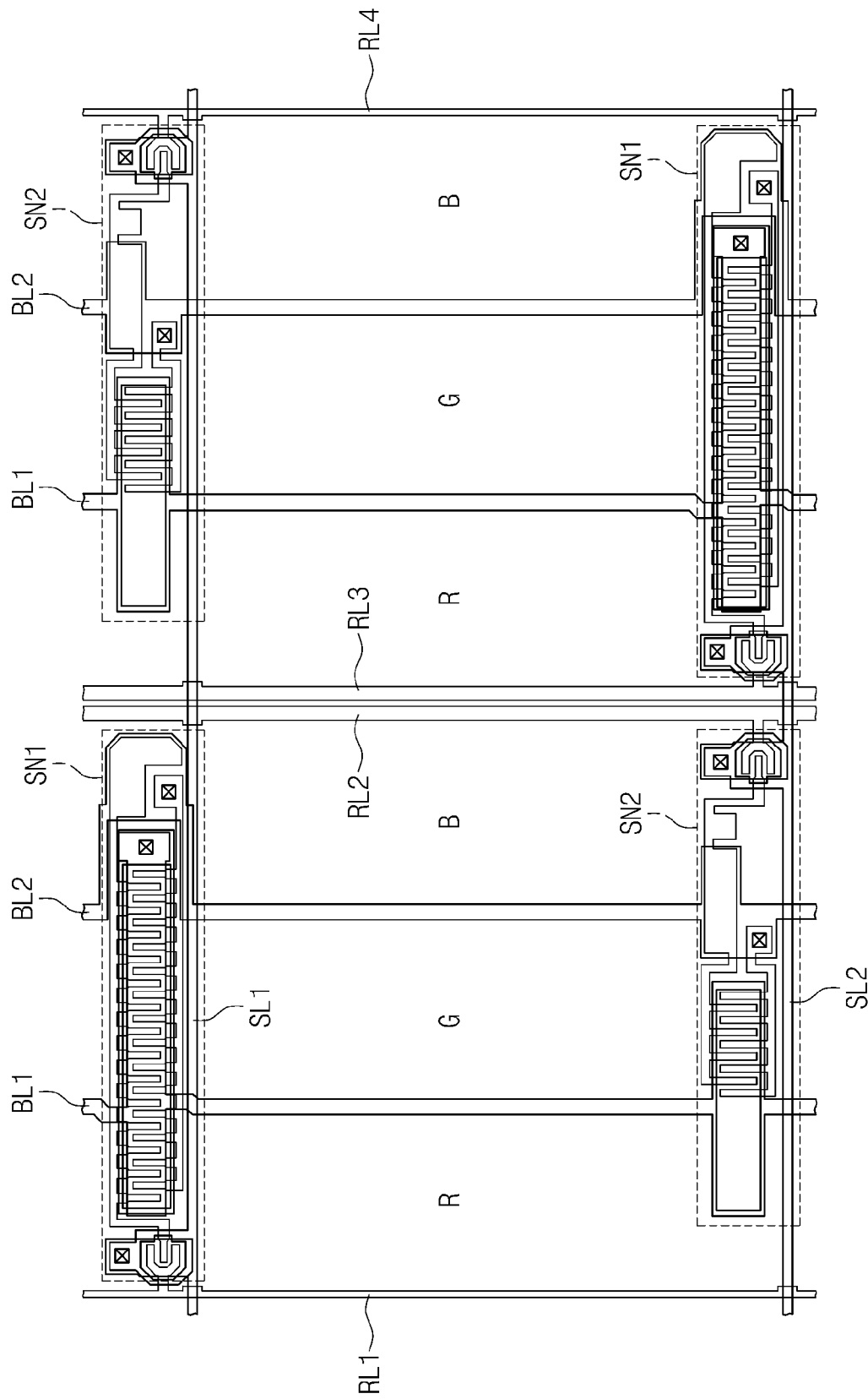
FIG. 4 is a top plane view of an exemplary embodiment of a second substrate according to the invention.

FIG. 4 is a top plane view of an exemplary embodiment of a second substrate according to the invention.

Referring to FIG. 4, a second substrate 120 may include first and second scan lines SL1 and SL2 extending in a first direction, first to fourth read-out lines RL1 through RL4 extending in a second direction substantially perpendicular to the first direction, and first and second bias lines BL1 and BL2 extending in the second direction.

First and second sensors SN1 and SN2 may be alternately arranged in the first direction and in the second direction. In an exemplary embodiment, the first read-out line RL1 may be connected to the firs sensors SN1, and the second read-out line RL2 may be connected to the second sensors SN2. The third read-out line RL3 may be connected to the firs sensors SN1, and the fourth read-out line RL4 may be connected to the second sensors SN2.

A first bias line BL1 may receive a first bias voltage VB1 from a voltage generator 180 to supply the first bias voltage VB1 to the first and second sensors SN1 and SN2. A second bias line BL2 may receive a second bias voltage VB2, having a lower level than a level of the first bias voltage VB 1, from the voltage generator 180 to supply the second bias voltage VB2 to the first and second sensors SN1 and SN2.

As shown in FIG. 4, the first and second bias lines BL1 and BL2 may be provided between the first and second read-out lines RL1 and RL2 and between the third and fourth read-out lines RL3 and RL4 in a top plan view.

The second substrate 120 may further include red, green and blue color pixels R, G and B, which are arranged in the first direction.

Figure 5:
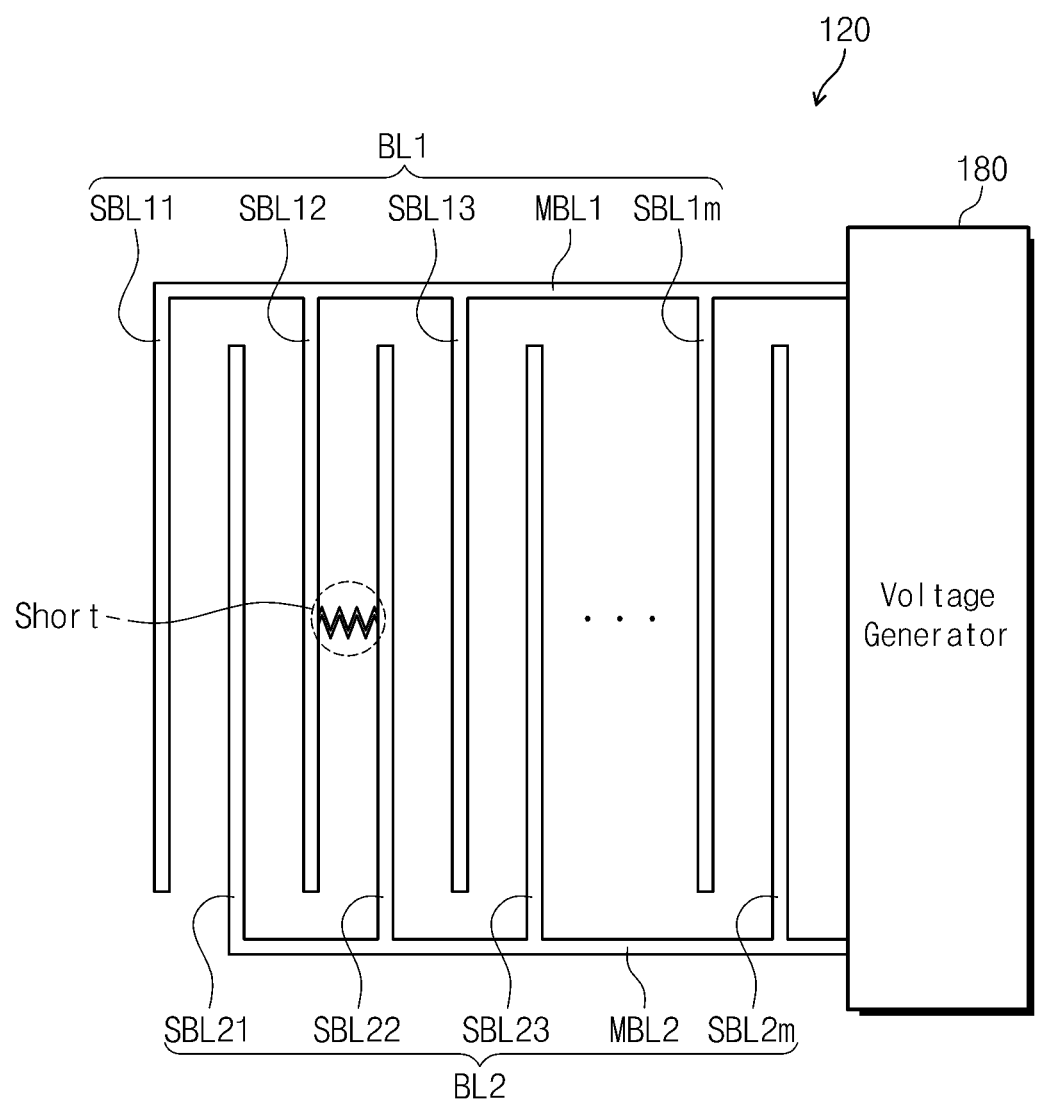
FIG. 5 is a diagram illustrating an exemplary embodiment of first and second bias lines arranged at a second substrate in FIG. 1.

FIG. 5 is a diagram illustrating first and second bias lines arranged at a second substrate in FIG. 1.

Referring to FIG. 5, a first bias line BL1 may include a first main line MBL1 and first sub lines SBL11 through SBL1*n* diverged from the first main line MBL1 corresponding to columns of sensors SN. The first bias line BL1 may supply the sensors SN with a first bias voltage VB1 provided from a voltage generator 180.

A second bias line BL2 may include a second main line MBL2 and second sub lines SBL21 through SBL2*n* diverged from the second main line MBL2 corresponding to columns of sensors SN. The second bias line BL2 may supply the sensors SN with a second bias voltage VB2 provided from the voltage generator 180.

The first sub lines SBL11 through SBL1*n* and the second sub lines SBL21 through SBL2*n* may be arranged in turn.

Returning to FIG. 3, since an overlap region between a gate electrode TGE1 and a source electrode SE5 of a first sensor transistor IRT is substantially large, the gate electrode TGE1 and the source electrode SE5 may be shorted during a manufacturing process thereof In such an embodiment, a shading defect may occur in sensors in a column including a shorted sensor. In such an embodiment, software repairing of an image processor (not shown) may not be effectively performed.

In an exemplary embodiment, one of the first sub lines SBL11 through SBL1n is shorted with a second sub line adjacent to the one first sub line, the one of the first sub lines being shorted may be separated from the first main line MBL1. In an alternative embodiment, one of the second sub lines SBL21 through SBL2n is shorted with a first sub line adjacent to the one second sub line, the one of the second sub lines being shorted may be separated from the second main line MBL2.

In an exemplary embodiment, the above-described repair operation may be carried out at a test process associated with the second substrate 120.

FIG. 6 is a diagram illustrating an exemplary embodiment of a second sub line which is separated from a second main line when first and second sub lines are shorted.

Referring to FIG. 6, when a first sub line SBL12 and a second sub line SBL22 are shorted, the second sub line SBL22 may be separated from a second main line MBL2. In an exemplary embodiment, a separation between the second sub line SBL22 and the second main line MBL2 may be performed by laser cutting. In such an embodiment, the second sub line SLB22 may be driven by a first bias voltage VB1 applied to the shorted first sub line SBL12.

Figure 7:
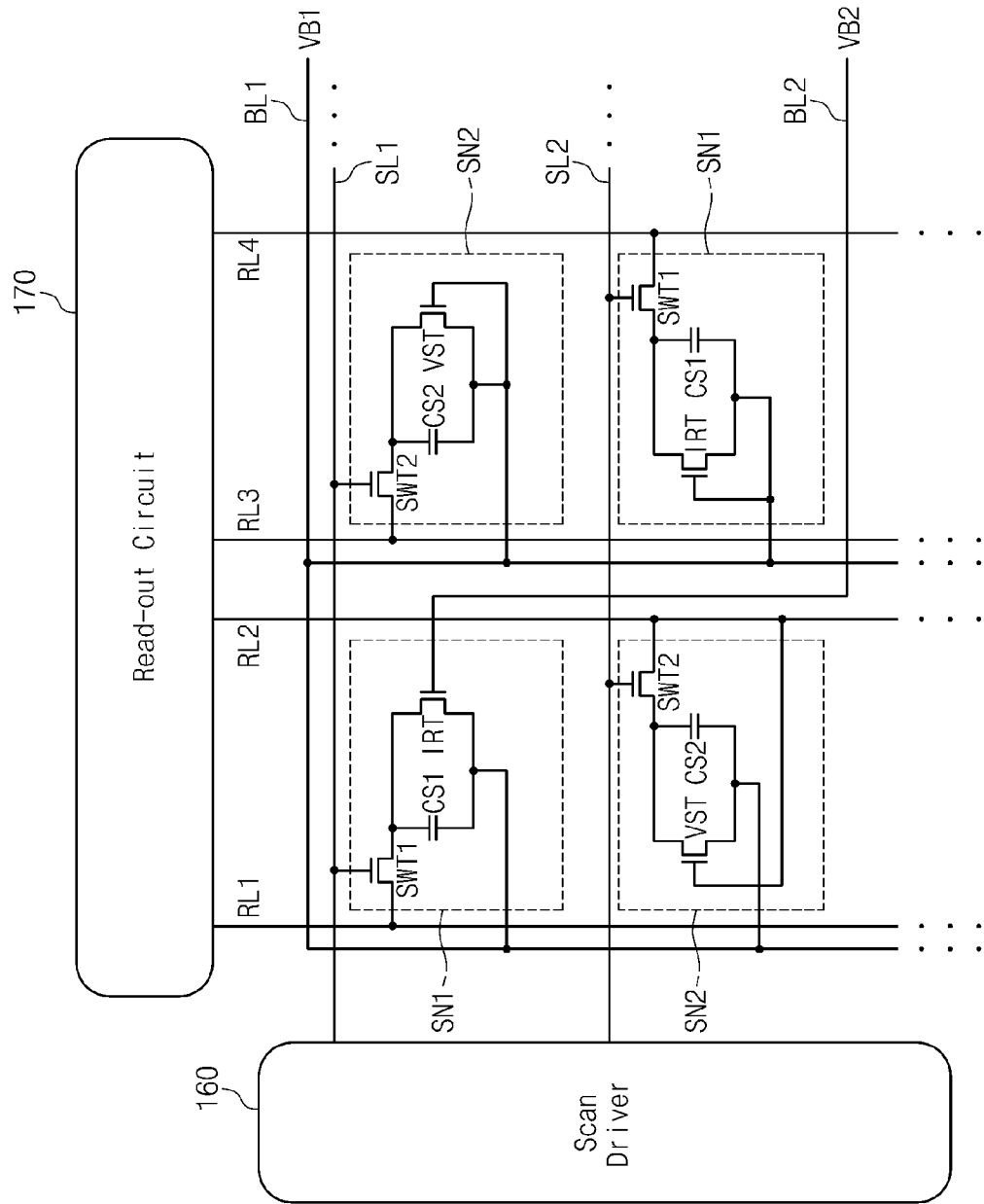
FIG. 7 is a circuit diagram illustrating an exemplary embodiment of a plurality of sensors in which a second sub line is separated from a second main line.

FIG. 7 is a circuit diagram illustrating an exemplary embodiment of a plurality of sensors in which a second sub line is separated from a second main line.

Referring to FIG. 7, when a second sub line SBL22 is separated, e.g., disconnected, from a second main line MBL2, a first bias voltage VB1 may be applied to a first sub line SBL12 being shorted. In such an embodiment, the first bias voltage VB1 may be supplied to gate and drain electrodes of a second sensor transistor VST included in a sensor SN2 connected with a read-out line RL3. In such an embodiment e, the first bias voltage VB1 may be supplied to gate and drain electrodes of a first sensor transistor IRT included in a sensor SN1 connected with a read-out line RL4.

When the first bias voltage VB1 is applied to both the gate and drain electrodes of the first and second sensor transistors IRT and VST, the sensitivity of the sensors SN1 and SN2 connected with the read-out lines RL4 and RL3 may decrease when compared with sensors connected with other read-out lines RL1, RL2 and RL5 through RLi. However, when a brightness difference (W-B) between a white and a block at a sensor having 256 scale is greater than or equal to 10, the sensitivity of the sensors SN1 and SN2 may be compensated by software processing with respect to coordinate information output from a read-out circuit 170.

Figure 8:
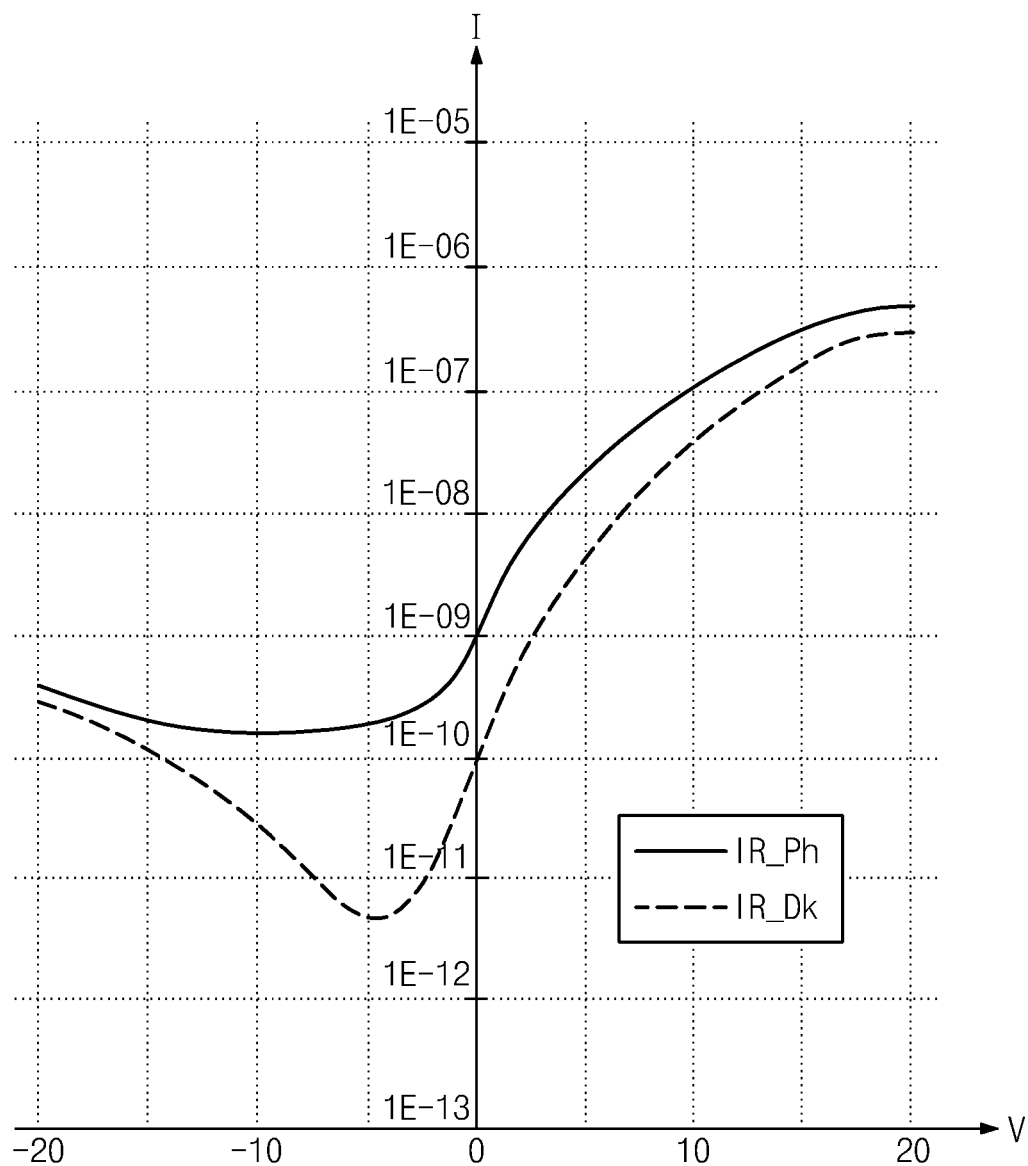
FIG. 8 is a graph illustrating current versus voltage for describing an operation of a sensor.

FIG. 8 is a graph illustrating current versus voltage for describing an operation of a sensor.

Referring to FIG. 8, operating characteristics of each of the first and second sensor transistors IRT and VST may vary based on a magnitude of a gate voltage Vg applied to gate electrodes thereof The first and second sensor transistors IRT and VST may operate at a turn-off region, a linear region, and a saturation region based on a magnitude of the gate voltage Vg. A drain current, that is, a photo current Ids of a thin film transistor may vary based on the amount of external light applied to its channel region. In FIG. 8, IR Ph denotes a current at the condition (a white state) that channel regions of the first and second sensor transistors IRT and VST are exposed by an external light. IR_Dk denotes a current at the condition (a black state) that channel regions of the first and second sensor transistors IRT and VST are blocked from the external light.

In an exemplary embodiment, where a second sub line SBL22 is separated from a second main line MBL2 due to short circuit between a first sub line SBL12 and the second sub line SBL22, a gate voltage Vg and a source voltage Vs of each of the first and second sensor transistors IRT and VST may be substantially identical to each other. In such an embodiment, a gate-source voltage Vgs may be zero (0) V. In such an embodiment, when the gate-source voltage Vgs is zero (0) V, a difference of photo currents Ids of white and black at a sensor may be maintained to be greater than or equal to a predetermined value. In such an embodiment, the sensitivity of the sensors SN1 and SN2 connected with the read-out lines RL4 and RL3 may be effectively compensated.

Figure 9:
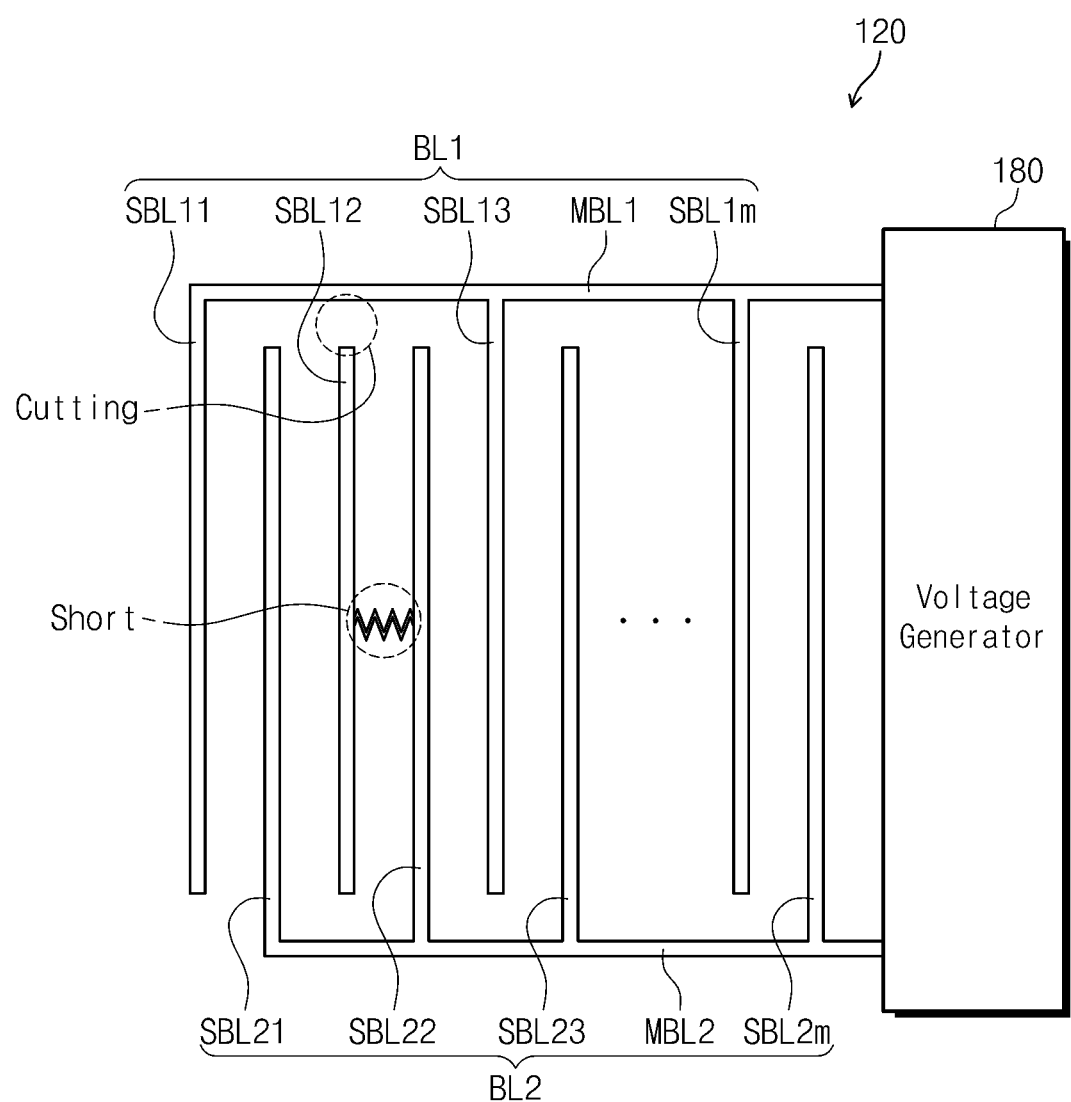
FIG. 9 is a diagram illustrating an exemplary embodiment of a first sub line which is separated from a first main line when first and second sub lines are shorted.

FIG. 9 is a diagram illustrating an exemplary embodiment of a first sub line which is separated from a first main line when first and second sub lines are shorted.

Referring to FIG. 9, when a first sub line SBL12 and a second sub line SBL22 are shorted, the first sub line SBL12 may be separated from a first main line MBL1. In an exemplary embodiment, a separation between the first sub line SBL12 and the first main line MBL1 may performed by laser cutting. In such an embodiment, the first sub line SLB 12 may be driven by a second bias voltage VB2 applied to the shorted second sub line SBL22.

Figure 10:
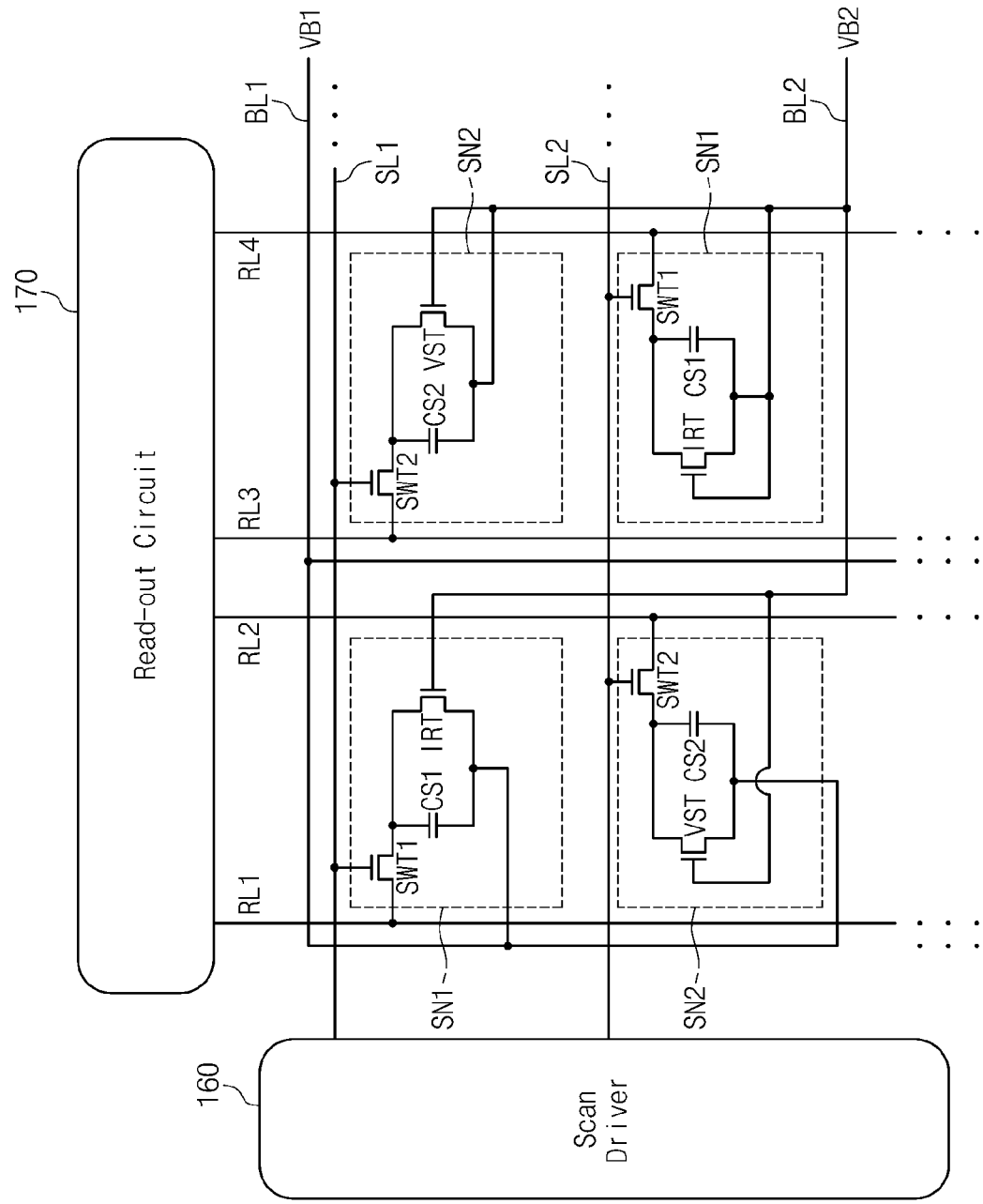
FIG. 10 is a circuit diagram illustrating an exemplary embodiment of a plurality of sensors in which a first sub line is separated from a first main line.

FIG. 10 is a circuit diagram illustrating an exemplary embodiment of a plurality of sensors in which a first sub line is separated from a first main line.

Referring to FIG. 10, when a first sub line SBL12 is separated from a first main line MBL1, a second bias voltage VB2 may be applied to a second sub line SBL22 being shorted. In such an embodiment, the second bias voltage VB2 may be supplied to gate and drain electrodes of a second sensor transistor VST included in a sensor SN2 connected with a read-out line RL3. In such an embodiment, the second bias voltage VB2 may be supplied to gate and drain electrodes of a first sensor transistor IRT included in a sensor SN1 connected with a read-out line RL4.

When a short circuit defect occurs between a gate electrode and source and drain electrodes of one of sensors SN1 and SN2 connected with read-out lines RL3 and RL4, a first main line MBL1 may be separated from a first sub line SBL12 connected with sensors in the column in which a shorted sensor is included, or a second main line MBL2 may be separated from a second sub line SBL22 connected with sensors in the column in which a shorted sensor is included. In such an embodiment, when a short circuit defect occurs between a gate electrode and source and drain electrodes, the short circuit defect may be repaired such that a shading defect due to a short circuit defect between a gate electrode and a source electrode is substantially minimized.

Returning to FIG. 10, an amount of a photo current IR_Ph may be smaller than an amount of a photo current IR_Dk. In an exemplary embodiment, the photo current IR_Ph may be a current when sensors included in a column where a short circuit is not generated are at a white state, and the photo current IR_Dk may be a current when sensors included in a column where a short circuit is generated are at a dark state. In an exemplary embodiment, an amount of the photo current IR_Dk of a transistor within a shorted sensor whose gate-source voltage Vgs is zero (0) V may be larger than an amount of the photo current IR_Ph of a sensor being not shorted at a white state.

In such an embodiment, a photo current IR_Dk of a transistor within a shorted sensor at a dark state may be substantially reduced by independently biasing first and second sub lines SBL12 and SBL22 being shorted.

Figure 11:
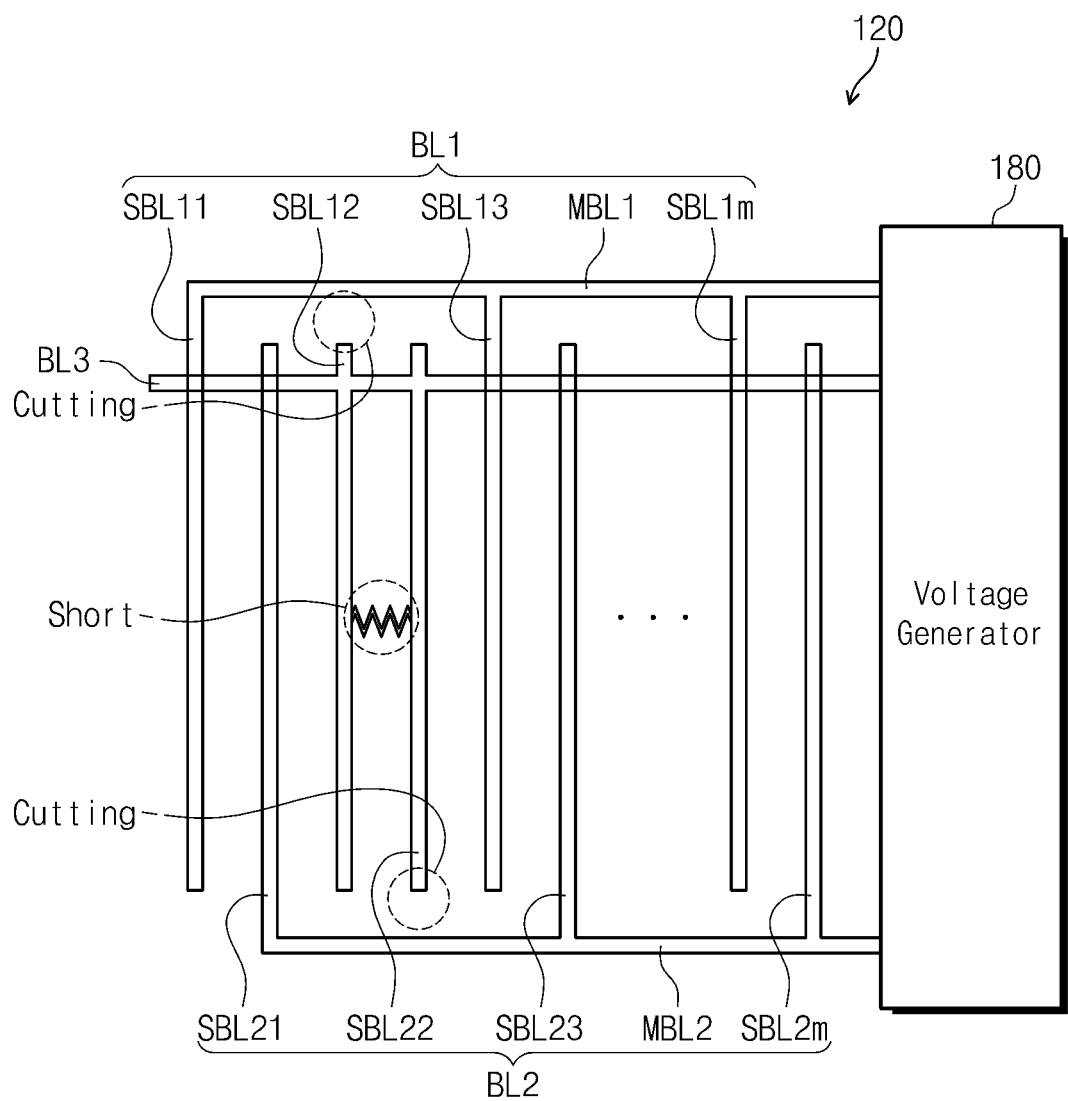
FIG. 11 is a diagram illustrating an exemplary embodiment of first and second sub lines which are connected to a bias line when the first and second sub lines are shorted.

FIG. 11 is a diagram illustrating an exemplary embodiment of first and second sub lines which are connected to a bias line when the first and second sub lines are shorted.

Referring to FIG. 11, a second substrate 120 may include a third bias line BL3. When a first sub line SBL12 and a second sub line SBL22 are shorted, the first sub line SBL12 may be separated from a first main line MBL1, and the second sub line SBL22 may be separated from a second main line MBL2. In an exemplary embodiment, a separation between the first sub line SBL12 and the first main line MBL1 and between the second sub line SBL22 and the second main line MBL2 may performed by laser cutting. The separated sub lines SBL12 and SBL22 may be connected to the third bias line BL3. In an exemplary embodiment, the first and second sub lines SLB12 and SBL22 may be driven by a third bias voltage VB3 supplied from a voltage generator 180 via the third bias line BL3. The third bias voltage VB3 may have a voltage in a range between a first bias voltage VB1 and a second bias voltage VB2.

Figure 12:
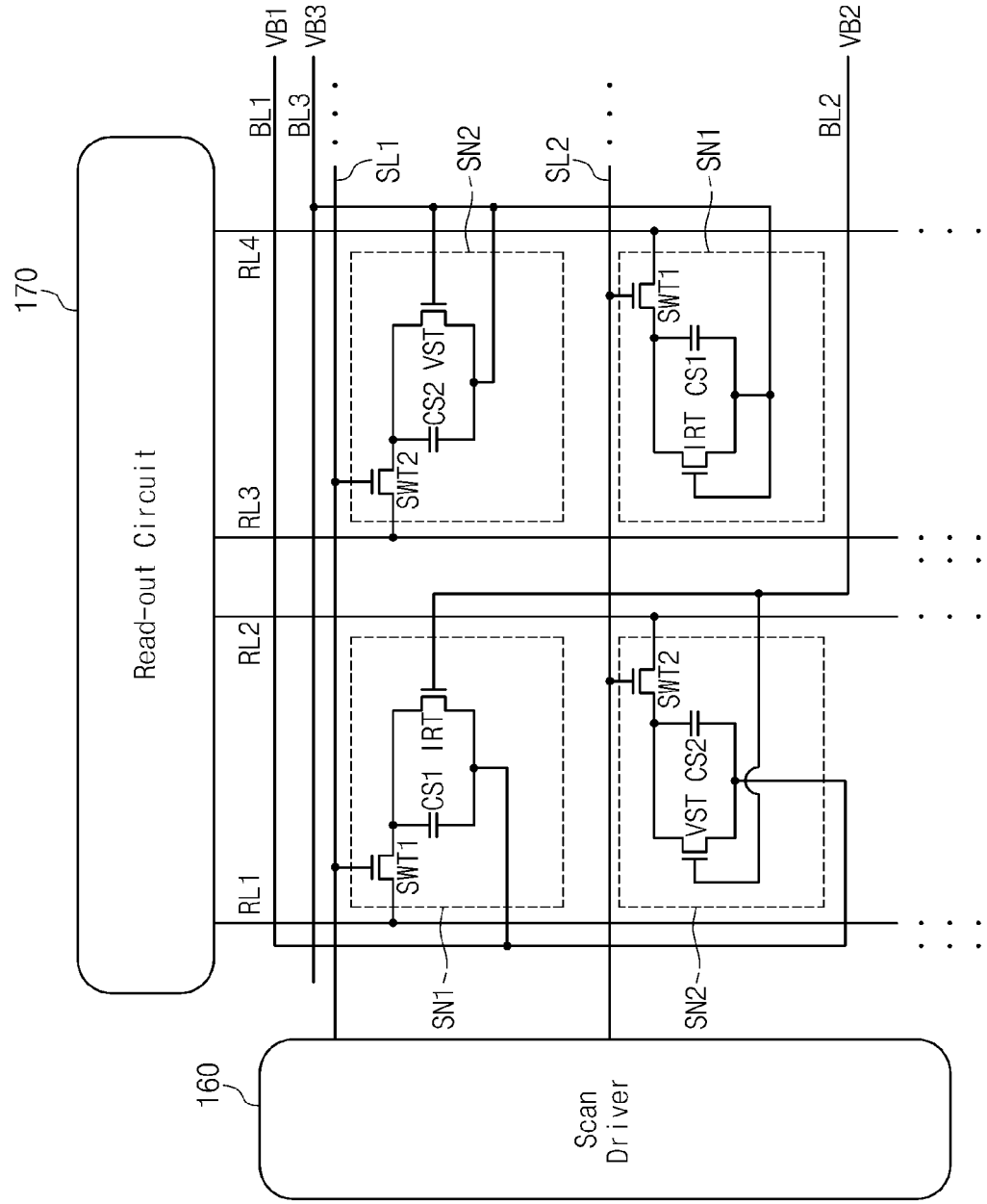
FIG. 12 is a circuit diagram illustrating an exemplary embodiment of a plurality of sensors in which a first sub line and a second sub line are connected to a bias line.

FIG. 12 is a circuit diagram illustrating an exemplary embodiment of a plurality of sensors in which a first sub line and a second sub line are connected to a bias line.

Referring to FIG. 12, after a first sub line SBL12 is separated from a first main line MBL1 and a second sub line SBL22 is separated from a second main line MBL2, the first and second sub lines SBL12 and SBL22 may be connected to a third bias line BL3 such that the first and second sub lines SBL12 and SBL22 are driven by a third bias voltage VB3. In such an embodiment, the third bias voltage VB3 may be applied to gate and drain electrodes of a second sensor transistor VST within a sensor SN2 connected with a read-out line RL3. In such an embodiment, the third bias voltage VB3 may be applied to gate and drain electrodes of a first sensor transistor IRT within a sensor SN1 connected with a read-out line RL4.

When the first and second sub lines SBL12 and SBL22 are driven by the third bias voltage VB3, a photo current IR_Dk of a light sensing transistor within a shorted sensor at a dark state may be substantially reduced.

The above-disclosed subject matter is to be considered illustrative, and not restrictive, and the appended claims are intended to cover all such modifications, enhancements, and other embodiments, which fall within the true spirit and scope. Thus, to the maximum extent allowed by law, the scope is to be determined by the broadest permissible interpretation of the following claims and their equivalents, and shall not be restricted or limited by the foregoing detailed description.

What is claimed is:

1. A light sensing panel comprising:
a plurality of sensors arranged in a plurality of rows and a plurality of columns, wherein the plurality of sensors receives a first bias voltage and a second bias voltage and outputs light sensing signals based on light incident thereto;
a first bias line which transfers the first bias voltage to the plurality of sensors; and
a second bias line which transfers the second bias voltage to the plurality of sensors,
wherein the first bias line comprises:
a first main line; and
a plurality of first sub lines diverged from the first main line and arranged in a second direction corresponding to the plurality of columns of the plurality of sensors,
wherein the second bias line comprises:
a second main line; and
a plurality of second sub lines diverged from the second main line and arranged in the second direction corresponding to the plurality of columns of the plurality of sensors,
wherein the plurality of first sub lines and the plurality of second sub lines are alternately arranged, and
wherein when a first sub line of the plurality of first sub lines is shorted with a second sub line of the plurality of second sub lines adjacent to the first sub line, the shorted first sub line is separated from the first main line.

2. The light sensing panel of claim 1, further comprising:
a plurality of scan lines corresponding to the plurality of rows, wherein each of the plurality of scan lines transfers a scan signal to corresponding sensors of the plurality of sensors; and
a plurality of read-out lines which transfers the light sensing signals output from the plurality of sensors.

3. The light sensing panel of claim 2, wherein each of the plurality of sensors comprises:
a capacitor having a first electrode and a second electrode;
a switching element which outputs a voltage of the first electrode of the capacitor to a corresponding read-out line of the plurality of read-out lines in response to a scan signal transferred via a corresponding scan line of the plurality of scan lines; and
a light sensing transistor having a first end connected to the first electrode of the capacitor, a second end connected to the second electrode of the capacitor, and a gate connected to a corresponding second sub line of the plurality of second sub lines,
wherein the second electrode of the capacitor is connected to a corresponding first sub line of the plurality of first sub lines.

4. The light sensing panel of claim 1, wherein
When a second sub line of the plurality of second sub lines is shorted with a first sub line adjacent to the second sub line, the shorted second sub line is separated from the second main line.

5. The light sensing panel of claim 4, further comprising:
a third bias line which transfers a third bias voltage,
wherein the shorted first sub line separated from the first main line and the shorted second sub line separated from the second main line are connected to the third bias line.

6. The light sensing panel of claim 5, wherein the third bias voltage has a voltage in a range between the first bias voltage and the second bias voltage.

7. The light sensing panel of claim 1, wherein the plurality of sensors comprises:
a plurality of first sensors which senses light in an infrared wavelength range; and
a plurality of second sensors which senses light in a visible wavelength range.

8. A display device comprising:
a display panel which display an image, wherein the display panel comprises:
a first substrate; and
a second substrate opposite to the first substrate,
wherein one of the first substrate and the second substrate of the display panel comprises:
a plurality of sensors arranged in a plurality of rows and a plurality of columns, wherein the plurality of sensors receives a first bias voltage and a second bias voltage and outputs light sensing signals based on light incident thereto;

a first bias line which transfers the first bias voltage to the plurality of sensors; and a second bias line which transfers the second bias voltage to the plurality of sensors, wherein the first bias line comprises:

a first main line; and a plurality of first sub lines diverged from the first main line and arranged in a second direction corresponding to the plurality of columns of the plurality of sensors, wherein the second bias line comprises:

a second main line; and a plurality of second sub lines diverged from the second main line and arranged in the second direction corresponding to the plurality of columns of the plurality of sensors, wherein the plurality of first sub lines and the plurality of second sub lines are alternately arranged, and wherein when a first sub line of the plurality of first sub lines is shorted with a second sub line of the plurality of second sub lines adjacent to the first sub line, the shorted first sub line is separated from the first main line.

9. The display device of claim 8, wherein the first substrate includes a plurality of pixels, and the second substrate includes the plurality of sensors, the first bias line and the second bias line.

10. The display device of claim 9, wherein the second substrate comprises:

a plurality of scan lines corresponding to the plurality of rows, wherein each of the plurality of scan lines transfers a scan signal to corresponding sensors of the plurality of sensors; and a plurality of read-out lines which transfers the light sensing signals output from the plurality of sensors.

11. The display device of claim 10, wherein each of the plurality of sensors comprises:

a capacitor having a first electrode and a second electrode;

a switching element which outputs a voltage of the first electrode of the capacitor to a corresponding read-out line of the plurality of read-out lines in response to a scan signal transferred via a corresponding scan line of the plurality of scan lines; and a light sensing transistor having a first end connected to the first electrode of the capacitor, a second end connected to the second electrode of the capacitor, and a gate connected to a corresponding second sub line of the plurality of second sub lines, wherein the second electrode of the capacitor is connected to a corresponding first sub line of the plurality of first sub lines.

12. The display device of claim 8, wherein

When a second sub line of the plurality of second sub lines is shorted with a first sub line adjacent to the second sub line, the shorted second sub line is separated from the second main line.

13. The display device of claim 12, wherein the second substrate further comprises a third bias line which transfers a third bias voltage, wherein the shorted first sub line separated from the first main line and the shorted second sub line separated from the second main line are connected to the third bias line.

14. The display device of claim 13, wherein the third bias voltage has a voltage in a range between the first bias voltage and the second bias voltage.

15. The display device of claim 8, wherein the plurality of sensors comprises:

a plurality of first sensors which senses light in an infrared wavelength range; and a plurality of second sensors which senses light in a visible wavelength range.

* * * * *